US012659201B2

(12) United States Patent
   Deparis

(10) Patent No.:  US 12,659,201 B2
(45) Date of Patent:       Jun. 16, 2026

(54) ELECTRONIC GENERATOR OF CARRIER MODULATED PULSE SIGNALS AND ASSOCIATED RADIOFREQUENCY SIGNALS TRANSMITTER

(71) Applicant: Commissariat à l'énergie atomique et aux énergies alternatives, Paris (FR)

(72) Inventor: Nicolas Deparis, Tencin (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 0 days.

(21) Appl. No.: 18/804,267

(22) Filed: Aug. 14, 2024

(65) Prior Publication Data

US 2025/0062938 A1     Feb. 20, 2025

(30) Foreign Application Priority Data

Aug. 18, 2023    (FR) ...................................... 2308774

(51) Int. Cl.
   *H04L 25/49*        (2006.01)
   *H04B 1/7163*       (2011.01)
   *H04B 1/717*        (2011.01)
(52) U.S. Cl.
   CPC ..... *H04L 25/4902* (2013.01); *H04B 1/71635* (2013.01); *H04B 1/7174* (2013.01)
(58) Field of Classification Search
   CPC . H04B 1/71635; H04B 1/7174; H04L 5/0007; H04L 25/4902; H04L 25/493;
   (Continued)

(56) References Cited

U.S. PATENT DOCUMENTS 4,481,489 A * 11/1984 Kurby ................. H03C 3/0933
                                          332/119
4,498,191 A * 2/1985 Rogers ................. H03J 1/0091
                                          455/164.2
(Continued)

FOREIGN PATENT DOCUMENTS

EP          3 799 300 A1     3/2021

OTHER PUBLICATIONS

Preliminary French Search Report issued Apr. 10, 2024 in French Application 2308774 filed on Aug. 18, 2023, 4 pages (with English Translation of Categories of Cited Documents).
(Continued)

*Primary Examiner* — Young T. Tse
(74) *Attorney, Agent, or Firm* — Oblon, McClelland, Maier & Neustadt, L.L.P.

(57)                    ABSTRACT

The present electronic generator of modulated subcarrier pulse signals includes a module for modulating a pulse train, the position and amplitude of which are controllable, forming a switching signal; a switching module, connected to the output of the module for modulating the pulse train, including at least one transistor, controlled by the switching signal, a voltage-controlled frequency-locking oscillator having a frequency-locking band around a free oscillation frequency controlled by a control voltage, connected to the output of the switching module, the switching module making possible the injection of a periodic pulse signal having a frequency spectrum including at least one frequency line within the frequency locking band. Such arrangement makes it possible to obtain, at the output of the oscillator, frequency-controlled, phase-controlled and amplitude-controlled modulated subcarrier pulsed signals.

10 Claims, 3 Drawing Sheets

(58) Field of Classification Search
CPC ... H04L 27/122; H04L 27/125; H04L 27/127;
H03K 7/02; H03K 7/04; H03K 7/06;
H03K 7/08; H03K 7/10
USPC ....... 375/135, 146, 237–239, 295, 297, 300,
375/306, 353; 331/14, 23, 59, 107 T,
331/109; 332/109, 112, 115; 370/212,
370/213; 455/108, 114.3, 129
See application file for complete search history.

(56) References Cited

U.S. PATENT DOCUMENTS

| | | | | |
|---|---|---|---|---|
| 5,045,956 A * | 9/1991 | Ejima | ................ | G11B 15/1875 |
| 5,225,794 A * | 7/1993 | Skalka | ...................... | H03L 7/12 |
| | | | | 331/74 |
| 5,379,002 A * | 1/1995 | Jokura | .................... | H03L 7/189 |
| | | | | 331/25 |
| 6,223,061 B1 * | 4/2001 | Dacus | ...................... | H03L 7/14 |
| | | | | 455/574 |
| 7,031,675 B2 * | 4/2006 | Kokubo | ................... | H04B 1/04 |
| | | | | 331/14 |
| 2005/0110537 A1 * | 5/2005 | Wurzer | ................... | H03L 7/099 |
| | | | | 327/156 |
| 2010/0188253 A1 | 7/2010 | Shearer | | |
| 2021/0091758 A1 | 3/2021 | Gonzalez Jimenez | | |

OTHER PUBLICATIONS

De Paris et al., "A 2 pJ/bit pulsed ILO UWB transmitter at 60GHz
in 65-nm CMOS-SOI", ICUWB, IEEE, 2009, 5 pages.
De Paris et al., "UWB in Millimeter Wave Band With Pulsed ILO",
IEEE Transactions on Circuits and Systems II: Express Briefs, vol.
55, No. 4, 2008, 5 pages.
Zhu et al., "Distributed Waveform Generator: A New Circuit
Technique for Ultra-Wideband Pulse Generation, Shaping and Modu-
lation", IEEE Journal of Solid-State Circuits, vol. 44, No. 3, 2009,
16 pages.

* cited by examiner

ELECTRONIC GENERATOR

PULSE GENERATOR

DELAY MODULE

MODULE FOR GENERATING SWITCHING SIGNALS

VCO

SWITCHING MODULE $S_1$ $S_2$ $S_3$ $S_4$ $S_5$ $V_T$ $V_{Am}$ $\tau$

2

4

6

8

10

12

14

15

16

18

ELECTRONIC GENERATOR OF CARRIER MODULATED PULSE SIGNALS AND ASSOCIATED RADIOFREQUENCY SIGNALS TRANSMITTER

This application claims priority to French Patent Application No. 2308774 filed Aug. 18, 2023, the entire disclosure of which is incorporated by reference herein.

FIELD OF THE INVENTION

The present invention relates to an electronic generator of modulated subcarrier pulsed signals and an associated transmitter of radiofrequency signals.

The invention relates to the generation of ultra-wideband phase- and amplitude modulated subcarrier pulsed signals.

The invention has many applications, more particularly in high-speed telecommunications, in low-power telecommunications, more particularly in low-power pulse radars, in the field of locating objects, in the field of self-powered sensors, in the field of radiofrequency sensors.

BACKGROUND OF THE INVENTION

In the prior art, ultra-wideband pulse modulation systems are known, in particular using pulse position modulation (PPM), on-off keying (OOK) amplitude modulation, and vector modulations QAM (quadrature amplitude modulation) or a combination of said modulations. The vector modulations QAM, such as e.g. the BPSK (binary phase-shift keying) modulation, require the generation of a reference signal, the carrier, with significant requirements in terms of phase noise. One of the limitations of the pulse vector modulation techniques lies, inter alia, in the complexity and the electrical consumption of the generation units of the reference signal, the carrier, and the modulation units.

Most pulse ultra-wideband direct signal generators synthesize the carrier frequency using a phase-locked loop (PLL) unit which is an electronic device for servoing the output phase or frequency according to the phase or frequency of a reference input signal. The synthesized signal requires complex modulation units to guarantee the generation of a pulse envelope signal with vector modulation. In order to synthesize high carrier frequencies, of several tens of GHz, it is necessary to develop complex PLLs, of significant power consumption and size. Moreover, one of the goals to be achieved is to reduce the phase noise of the output signals.

The subject matter of the invention is to remedy the drawbacks of the aforementioned prior art.

SUMMARY OF THE INVENTION

To this end, the invention proposes, according to one aspect, an electronic generator of pulsed signals under modulated carrier including:
- a module for modulating a pulse train, the position and amplitude of which are controllable, forming a switching signal;
- a switching module, connected to the output of the module for modulating a pulse train, including at least one transistor, the switching of which is controlled by said switching signal,
- a voltage-controlled frequency-locking oscillator having a frequency-locking band around a free oscillation frequency controlled by a control voltage, the oscillator being connected to the output of the switching module, the switching module providing a periodic pulse signal, the periodic pulse signal being injected into the oscillator, the periodic pulse signal having a frequency spectrum including at least one frequency line in said frequency locking band, the arrangement of said modules serving to obtain, at the output of the oscillator, frequency-controlled, phase-controlled and amplitude-controlled modulated subcarrier pulse signals.

Advantageously, the proposed generator serves to perform a direct generation of modulated subcarrier pulse signals, locked by pulsed injection, frequency-controlled, phase-controlled, amplitude-controlled and pulse width-controlled, without using a phase-locked loop.

The generator of modulated subcarrier pulsed signals according to the invention can further have one or a plurality of the features below, taken independently or according to all technically feasible combinations.

The module for modulating a pulse train comprises a generator of periodically repeated pulses forming an input signal, connected to the input of a delay module configured to add in programmable delays to generate a position modulated signal, the position modulated signal being supplied to the input of a generation module of switching signals, controlled by a voltage signal.

The modulated subcarrier pulse signals are further pulse width-controlled according to said input signal.

The delay module configured to add in programmable delays is a voltage-to-time or current-to-time converter module.

The module for generating switching signals comprises at least one component for amplifying electrical signals with a very short switching time, the amplitude of which is controlled by said voltage signal.

The module for generating switching signals comprises a number N of transistor inverters connected in series.

Each of said modulation module, switching module and oscillator is embodied in the form of CMOS components.

According to another aspect, the invention relates to a radiofrequency signal transmitter including an electronic generator of modulated subcarrier pulsed signals as briefly introduced, and a transmission antenna connected to said electronic generator of modulated subcarrier pulsed signals.

According to one feature, the radiofrequency signal transmitter further includes a power amplifier connected between the output of said electronic generator of modulated subcarrier pulsed signals and said transmission antenna.

BRIEF DESCRIPTION OF THE DRAWINGS

Other features and advantages of the invention will be clear from the description thereof which is given below as a non-limiting example, with reference to the enclosed figures, among which.

DETAILED DESCRIPTION OF EMBODIMENTS

Figure 1:
FIG. 1 is a unit diagram of a radiofrequency signal transmitter including an electronic generator of modulated subcarrier pulsed signals according to an embodiment of the invention.

FIG. 1 schematically shows a radiofrequency signal transmitter 2 comprising an electronic generator 4 of modulated subcarrier pulse signals, the input of which is connected to a pulse generator 6 and the output of which is connected to a power amplifier 8 and to a transmission antenna 10.

The power amplifier is optional and may not be present in alternative embodiments.

According to a variant, the pulse generator 6 is integrated into the electronic generator 4 of modulated subcarrier pulsed signals.

The pulse generator 6 provides a periodic input signal $S_1$, formed by periodically repeated pulse trains, with a pulse repetition period PRP=1/PRF where PRF is the pulse repetition frequency.

The electronic generator 4 of modulated subcarrier pulsed signals, referred to hereinafter as generator 4, includes:

a module 15 for modulating a pulse train forming a switching signal $S_3$, the position and amplitude of which can be controlled; the module 15 includes, in the embodiment illustrated, a delay module 12 configured to add in programmable delays on the input signal $S_1$, generating at the output thereof, a position modulated signal $S_2$, and a module 14 for generating switching signals, of amplitude voltage-controlled by a signal $V_{Am}$, receiving as input, the position modulated signal $S_2$;

a switching module 16, connected to the output of the module 15, including at least one transistor, the switching of which is controlled by the switching signal $S_3$, the switching module 16 making possible the injection, at the input of an oscillator 18, of a signal composed of the modulated periodic pulse signal $S_4$;

an oscillation module 18 comprising one oscillator, having a free oscillation frequency controlled by a control voltage $V_T$, connected to the output of the switching module 16. Such an oscillator is also known as a VCO (Voltage-Controlled Oscillator). The oscillator 18 has a frequency-locking band around the free oscillation frequency thereof.

The modulated periodic pulse signal $S_4$ has a frequency spectrum including at least one frequency line within the frequency-locking band of the oscillator 18.

Thereby, advantageously, the switching times in the switching module 16, controlled by the module 14, ensure the shortest possible transitions in order to generate a spectrum of lines, at least one of the lines of which is present with sufficient energy to ensure locking within the frequency locking band of oscillator 18.

At the output of the oscillator 18 subcarrier pulsed signals $S_5$ are obtained, including the following characteristics:

a relative phase controlled by the delay signal T of the module 12, an amplitude controlled by the signal $V_{Am}$ of the module 14, a locking frequency and phase controlled by the signal $V_T$ of the oscillator, a pulse width controlled by the pulse signal of the input signal $S_1$.

The arrangement of said modules makes it possible to obtain modulated subcarrier pulse signals, frequency-controlled, position (or phase)-controlled, width-controlled and amplitude-controlled.

Figure 2:
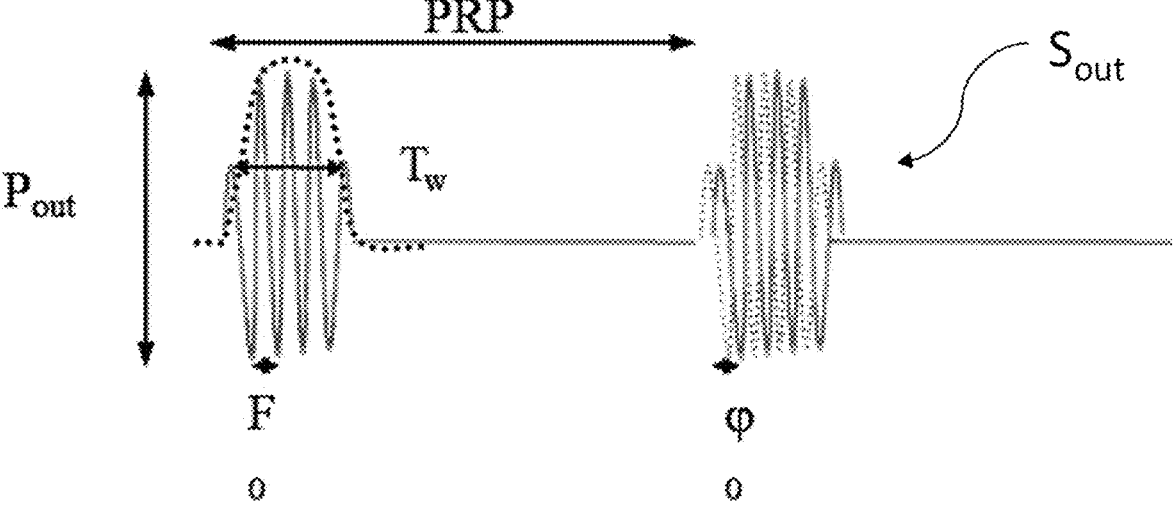
FIG. 2 schematically shows a generated subcarrier pulse signal waveform.

FIG. 2 illustrates an example of a subcarrier pulse signal as a function of time. In other words, FIG. 2 shows an example of a generated waveform.

The modulated subcarrier pulse signal $S_5$ is characterized by:

the power $P_{out}$ thereof, i.e. indirectly the amplitude thereof, the central frequency $F_0$ which is an integral sub-multiple of the pulse repetition frequency of the signal $S_1$, the phase relative to the preceding pulse $\varphi_0$, the width at mid-height of the envelope $T_W$, the repetition period PRP.

Figure 3:
FIG. 3 schematically represents an embodiment of an electronic generator of modulated subcarrier pulsed signals.

FIG. 3 illustrates an embodiment of an electronic generator 4, wherein the modules 12, 14, 16, 18 are implemented with electronic components by means of the CMOS (Complementary Metal Oxide Semi-Conductor) technology.

The module 12 is suitable for adding in programmable delays $\tau_m$ (t).

In the embodiment illustrated, the module 12 is formed by a delay circuit which performs a voltage-time conversion, based on the voltage signal $V_{in}$, e.g. implemented by using a shunt capacitor circuit.

Of course, any other controllable delay circuit can be used, e.g. a current starved delay circuit or a variable resistance circuit.

The delay signals act as control signals serving to define with great granularity the starting time of the oscillator 18.

In one embodiment, the delay module 12 is controlled by three delay signals (or control signals), corresponding to phase shifts of 45°, 90° and 180°, respectively, for a sinusoidal reference signal, e.g. of a frequency equal to 60 GHz.

At the output of the delay module 12 a position modulated signal $S_2$ (PPM) is obtained, which results in a phase modulation in the modulated subcarrier pulse signal $S_5$.

The signal $S_2$ is transmitted to the input of the module 14 for generating switching signals $S_3$, the amplitude of the output signal of the module being controlled by a voltage $V_{Am}$.

In one embodiment, the module 14 is formed by a number N of inverters connected in series, N being equal to 3 in the example. The module 14 comprises N=3 transistor inverters $14_1$, $14_2$ and $14_3$, which have the advantage of having short switching times, e.g. less than 10 picoseconds in the SOI 65 nm CMOS technology.

However, it is understood that the invention applies for any number N of inverters, different from the number illustrated in the example.

The transistors of the inverters $14_1$, $14_2$ and $14_3$ are dimensioned according to the frequency-locking band of the oscillator 18 and to the free oscillation frequency of the oscillator 18, in order to permit the switching of the module 16, on the rising edge, with the shortest possible switching time. As an example, the switching time of the module 16 is less than 10 picoseconds for a free oscillation frequency of 60 GHz.

Indeed, the use of a number N of inverters in series serves to asymptotically obtain the shortest transition times, and more particularly the shortest rise times.

If the number N of inverters is even, the pulse signal $S_5$ at the output of the generator 6 starts on a rising edge of the input signal $S_1$. If the number N of inverters is odd, the pulse signal $S_5$ at the output of the generator 6 starts on a falling edge of the input signal $S_1$.

The switching signal $S_3$ obtained at the output of the module 14 is supplied at the input of the switching module 16, which switches between an off mode and an on mode.

When the switching signal $S_3$ is in the low state (0V by convention), no current flows in the module 16. When the switching signal $S_3$ goes to the high state (voltage equal to $V_A$, by convention), the module 16 becomes conductive, a current flows to the oscillation module 18. The current comprises the amplitude-controlled pulse current, denoted by $S_4$, rich in harmonics of the input signal $S_1$.

In the embodiment shown in FIG. 3, the switching module 16 consists of a transistor 22. More generally, the switching module 16 includes at least one transistor.

The control voltage on the gate of the transistor 22 serves to control the current injected into the main branch of the oscillator 18, and thereby to control the output power of the oscillator and to favor locking by injection.

The supply voltage $V_{Am}$ of the module 14 serves to control the control voltage on the gate of the transistor 22. Thereby, the supply voltage $V_{Am}$ serves to control the output power of the oscillator.

The supply voltage $V_{Am}$ of the module 14 corresponds in an embodiment to the supply voltage of the last inverter of the series of inverters, which is the inverter 14₃ in the example. More generally, the supply voltage $V_{Am}$ is at least the supply voltage of the last of the N inverters, the inverters which precede the last being may also be supplied by this supply voltage.

The oscillator 18 comprises variable capacitance diodes 24, 26, also called varactor diodes or varicap diodes, controlled by the control voltage $V_T$, a field-effect transistor 28 and a capacitor 30.

The free oscillation frequency f0 of the oscillator 18 is a function of control voltage $V_T$. A modulation of the applied voltage around the control voltage modifies the instantaneous phase of the output central frequency. For example, in an example of implementation, the central average frequency is comprised between 55 and 65 GHz.

The pulse signal $S_4$ and the control voltage $V_T$ serve to lock the output frequency of the oscillator 18 on an integer multiple of the frequency of the input signal $S_1$. Such phenomenon is known as injection locking of an oscillator.

Such an oscillator starts with a low energy coming from a harmonic component present in the frequency locking band $\Delta F$ thereof, close to the free oscillation frequency $f_0$ thereof.

The locking phenomenon is transient and depends strongly on the external quality coefficient of the oscillator $Q_{ext}$, on the power of the oscillator $P_{osc}$ and on the power of the injected signal $S_4$, denoted by $P_{inj}$.

The locking band is defined by Adler's formula:

$$\Delta F = \frac{f_0}{2Q_{ext}} \sqrt{\frac{P_{inj}}{P_{osc}}}$$

During ignition, in the transient state, the two powers $P_{osc}(t)$ and $P_{inj}(t)$ are a function of time.

Initially, the power of the oscillator $P_{osc}(t)$ is much lower than the power of the injected signal, $P_{inj}(t)$, and the locking band is large.

In steady state, the power of the oscillator $P_{osc}(t)$ is greater than the power of the injected signal, $P_{inj}(t)$, the locking band decreases. In order to ensure that the oscillator is locked, in other words in order to ensure the presence of a harmonic component in the locking band of the oscillator, the control voltage $V_T$ is applied to modulate the frequency $f_0$.

Advantageously, the electrical energy consumption of an electronic generator of modulated subcarrier pulsed signals as described is low. When the oscillator is not in operation, only a leakage current, of small amplitude, flows.

When the CMOS technology is used, the generator power consumption is a function of the pulse repetition rate and of the energy consumption of the oscillator.

For example, for a peak transmission power $P_{out}$=10 mW (10 dBm) and an energy efficiency η=20% (i.e. a static consumption of 50 mW for the oscillator), if the RF pulse is switched on during $T_{ON}$=500 ps (i.e. 30 periods for a carrier at 60 GHz and an occupied bandwidth of 4 GHz), the energy consumed per RF pulse is 50 mW×300 PS=15 PJ.

Advantageously, the invention makes possible a rapid and time-controlled activation of an oscillation module by means of pulses with short transition times.

Advantageously, the programmable delay added in serves to determine the starting time of the oscillator.

Advantageously, in the electronic generator of subcarrier pulse signals described, the initial starting conditions of the oscillator, in particular the starting time, are determined before the frequency synthesis.

Advantageously, the control voltage $V_T$ applied serves to control the phase during the starting of the oscillator.

Advantageously, the electronic generator of modulated subcarrier pulsed signals serves to perform a phase modulation n-PSK, an amplitude modulation n-AM and/or joint phase and amplitude modulation n-QAM, with a number of phase states, e.g. comprised between 2 to 16.

The invention claimed is:

1. An electronic generator comprising:
   a module for modulating a pulse train, a position and an amplitude of the pulse train are controllable, forming a switching signal;
   a switching module connected to an output of the module for modulating the pulse train, wherein the switching module includes at least one transistor and is controlled by said switching signal; and
   a voltage-controlled frequency-locking oscillator having a frequency-locking band around a free oscillation frequency controlled by a control voltage, the oscillator being connected to an output of the switching module, the switching module providing a periodic pulse signal which is being injected into the oscillator,
   wherein the periodic pulse signal having a frequency spectrum including at least one frequency line in said frequency-locking band, the arrangement of the module for modulating the pulse train, the switching module and the oscillator being configured to obtain frequency-controlled, phase-controlled and amplitude-controlled modulated subcarrier pulse signals at an output of the oscillator.

2. The electronic generator according to claim 1, wherein the module for modulating the pulse train comprises a delay module and a module for generating switching signals, the electronic generator further comprising a generator of periodically repeated pulses forming an input signal connected to an input of the delay module, the delay module being configured to add programmable delays to generate a position modulated signal, said position modulated signal being supplied to an input of the module for generating the switching signals, controlled by a voltage signal.

3. The electronic generator according to claim 2, wherein said frequency-controlled, phase-controlled and amplitude-controlled modulated subcarrier pulse signals are pulse width-controlled according to said input signal.

4. The electronic generator according to claim 2, wherein the module for generating the switching signals comprises three transistor inverters connected in series.

5. The electronic generator according to claim 2, wherein the delay module is a voltage-to-time or current-to-time converter module and is configured to add the programmable delays.

6. The electronic generator according to claim 2, wherein the module for generating the switching signals comprises at least one component for amplifying electrical signals with a switching time inferior to 10 picoseconds for an oscillation frequency of 60 Ghz, of amplitude controlled by said voltage signal.

7. The electronic generator according to claim 6, wherein said module for generating the switching signals comprises a predetermined number of transistor inverters connected in series.

8. The electronic generator according to claim 1, wherein each of said modulation module, switching module and oscillator is implemented in the form of complementary metal oxide semiconductor (CMOS) components.

9. A transmitter of radio frequency signals including the electronic generator according to claim 1 and a transmission antenna coupled to said electronic generator.

10. The transmitter of radio frequency signals according to claim 9, further including a power amplifier connected between an output of said electronic generator and said transmission antenna.

* * * * *